US012805984B2

(12) United States Patent
Xiao et al.

(10) Patent No.: US 12,805,984 B2
(45) Date of Patent: Nov. 24, 2026

(54) METHOD AND APPARATUS FOR MATCHING GINGIVAL DATA, AND DEVICE

(71) Applicant: Shining 3D Tech Co., Ltd., Hangzhou (CN)

(72) Inventors: Shujuan Xiao, Hangzhou (CN); Xiaojun Chen, Hangzhou (CN); Chao Ma, Hangzhou (CN); Xiaobo Zhao, Hangzhou (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 19/217,866

(22) Filed: May 23, 2025

(65) Prior Publication Data

US 2026/0157826 A1 Jun. 11, 2026

(30) Foreign Application Priority Data

May 27, 2024 (CN) ........................ 202410662688.3

(51) Int. Cl.

*A61C 9/00* (2006.01)
*G06T 3/4038* (2024.01)

(Continued)

(52) U.S. Cl.

CPC .......... *A61C 9/0053* (2013.01); *G06T 3/4038* (2013.01); *G06T 7/70* (2017.01);

(Continued)

(58) Field of Classification Search

None

See application file for complete search history.

(56) References Cited

U.S. PATENT DOCUMENTS

2023/0301755 A1 9/2023 Ma
2024/0033055 A1* 2/2024 Crockett .............. A61C 9/0046

FOREIGN PATENT DOCUMENTS

CN 109009509 A 12/2018
CN 114052960 A 2/2022

(Continued)

OTHER PUBLICATIONS

Imburgia et al., Accuracy of four intraoral scanners in oral implantology: a comparative in vitro study, BMC Oral Health (2017) 17:92 , DOI 10.1186/s12903-017-0383-4 (Year: 2017).*

(Continued)

*Primary Examiner* — Kee M Tung
*Assistant Examiner* — Biao Chen
(74) *Attorney, Agent, or Firm* — Scully, Scott, Murphy & Presser, P.C.

(57) ABSTRACT

A method and apparatus for matching gingival data, and a device are provided. The method includes: acquiring first data of an oral cavity in a first state, the first data including three-dimensional data of a gingiva; acquiring second data of the oral cavity in a second state, the second data including three-dimensional data of a mark point of the scanning rod mounted on a implant and scanning data corresponding to a scanning area, the scanning data including data of a gingiva and the mark point of the scanning rod in the scanning area; and performing a splicing operation on the three-dimensional data of the gingiva and the three-dimensional data of the mark point according to the scanning data of the scanning area to acquire matched data of the gingiva and the scanning rod.

13 Claims, 5 Drawing Sheets

(51) Int. Cl.
*G06T 7/70* (2017.01)
*G06T 17/00* (2006.01)

(52) U.S. Cl.
CPC .... *G06T 17/00* (2013.01); *G06T 2207/10028* (2013.01); *G06T 2207/30036* (2013.01); *G06T 2210/41* (2013.01)

(56) References Cited

FOREIGN PATENT DOCUMENTS

| | | | | | |
|---|---|---|---|---|---|
| CN | 114404084 | A | | 4/2022 | |
| CN | 114831756 | A | | 8/2022 | |
| CN | 115938181 | A | * | 4/2023 | ............. G16H 50/50 |
| CN | 116077224 | A | | 5/2023 | |
| JP | S6154252 | A | | 8/1985 | |
| JP | 2009501616 | A | | 1/2009 | |
| JP | 2011509776 | A | | 3/2011 | |
| JP | 2023536171 | A | | 8/2023 | |
| WO | 2023213255 | A1 | | 11/2023 | |

OTHER PUBLICATIONS

Su et al.,Intraoral Digital Impression Technique: A Review, Journal of Prosthodontics 24 (2015) 313-321 (Year: 2015).*

Chen, a machine-translated English version of a foreign patent application (CN 116077224). (Year: 2023).*

Yan, a machine-translated English version of a foreign patent application (CN 115938181). (Year: 2023).*

Xu, Xiaobo et al., "Application of intraoral scanning digital impression technology in full crown restoration of subgingival defect in molar area", J Clin Stomatol, vol. 39, No. 1, Jan. 31, 2023, pp. 11-14.

The first Office Action and search report of priority CN application No. 202410662688.3, issued on Jul. 3, 2024.

Office Action dated Jul. 15, 2025 received in Japanese Patent Application No. 2025-087510.

The first office action of counterpart KR application No. 10-2025-0068538 was issued on Aug. 6, 2025.

The EESR of counterpart EP application No. 25172998.4 was issued on Oct. 22, 2025.

* cited by examiner

METHOD AND APPARATUS FOR MATCHING GINGIVAL DATA, AND DEVICE

CROSS-REFERENCE TO RELATED APPLICATION

This application claims priority to Chinese Patent Application No. 202410662688.3, filed to the China National Intellectual Property Administration on May, 27, 2024 and entitled "Method and Apparatus for Matching Gingival Data, and Device", the disclosure of which is hereby incorporated by reference in its entirety.

TECHNICAL FIELD

The present application belongs to the technical field of oral medicine, and relates to a method and apparatus for matching gingival data, and a device.

BACKGROUND

In a digital modeling process for dental implantation, it is required to acquire oral scan data of a gingiva first to determine the site and direction of an implant, then a scanning rod is employed for acquiring a position of the implant, and finally, a relative position relation between the implant and the gingiva is determined. In the above flow, it is needed to use a plurality of devices for scanning and software cooperating with each of the devices. Because data importing and exporting flows are added by using different software, there is a problem of low modeling efficiency in the implanting digital modeling process.

SUMMARY

In a first aspect, embodiments of the present application provide a method for matching gingival data, which may include:

acquiring first data of an oral cavity in a first state, where the oral cavity in the first state refers to that an implant has been implanted into the oral cavity, and the first data includes three-dimensional data of a gingiva;

acquiring second data of the oral cavity in a second state, where the oral cavity in the second state refers to that a scanning rod is mounted on the implant in the oral cavity, the second data includes three-dimensional data of a mark point of the scanning rod mounted on the implant and scanning data corresponding to a scanning area, the scanning data comprises data of a gingiva and the mark point of the scanning rod in the scanning area; and performing a splicing operation on the three-dimensional data of the gingiva and the three-dimensional data of the mark point according to the scanning data of the scanning area to acquire matched data of the gingiva and the scanning rod.

In some embodiments of the present application, a way of acquiring the first data may include:

projecting a preset image into the oral cavity in the first state to acquire a structured light image of an inner surface of the oral cavity; and performing three-dimensional reconstruction according to the structured light image to determine the three-dimensional data of the gingiva.

In the above implementation process, by way of acquiring the first data of the oral cavity through the structured light technique, the precision of the acquired first data of the oral cavity can be improved by actively projecting the preset image and combining with data processing.

In some embodiments of the present application, a way of acquiring the second data may include:

projecting illuminating light into the oral cavity to acquire a mark point image of the inner surface of the oral cavity; determining the three-dimensional data of the mark point according to the mark point image; projecting a structured light image and the illuminating light alternately to the scanning area to acquire a structured light image and a mark point image of the scanning area; performing three-dimensional reconstruction according to the structured light image to acquire first point cloud data; determining the three-dimensional data of the mark point of the scanning area according to the mark point image; and determining the scanning data of the scanning area according to the three-dimensional data of the mark point of the scanning area and the first point cloud data.

In some embodiments of the present application, the scanning data of the scanning area is determined through acquiring, processing, and matching of the structured light and the mark point image as well as point cloud processing and algorithm. The structured light image and the mark point image of the scanning area are acquired through a structured light scanning technique and a photogrammetric technology, the first point cloud data characterizing a surface of the scanning area is acquired by performing three-dimensional reconstruction according to the structured light image, and finally, the first point cloud data and the three-dimensional data of the mark point of the scanning area are matched to acquire intact scanning data of the scanning area. Therefore, the accuracy of acquiring the scanning data of the scanning area is improved.

In some embodiments of the present application, a way of acquiring the second data may further include:

projecting the structured light image and the illuminating light alternately into the oral cavity to acquire a structured light image and a mark point image in the oral cavity; performing three-dimensional reconstruction according to the structured light image to acquire second point cloud data; determining the three-dimensional data of the mark point according to the mark point image; and determining the three-dimensional data of the inner surface of the oral cavity according to the second point cloud data and the three-dimensional data of the mark point.

In some embodiments of the present application, the three-dimensional data of the inner surface of the oral cavity is determined through acquiring, processing, and matching of the structured light and the mark point image as well as point cloud processing and algorithm. The structured light image and the mark point image of the inner surface of the oral cavity are acquired through a structured light scanning technique and a photogrammetric technology, the second point cloud data characterizing the inner surface of the oral cavity is acquired by performing three-dimensional reconstruction according to the structured light image, and finally, the second point cloud data and the three-dimensional data of the mark point in the oral cavity are matched to acquire intact three-dimensional data in the oral cavity. The three-dimensional data in the oral cavity includes the scanning data of the scanning area. Therefore, the accuracy of acquiring the scanning data of the scanning area can be improved.

In some embodiments of the present application, the performing the splicing operation on the three-dimensional data of the gingiva and the three-dimensional data of the mark point according to the scanning data of the scanning area to acquire the matched data of the gingiva and the scanning rod may include:

determining three-dimensional data of the scanning rod according to the three-dimensional data of the mark point; splicing the three-dimensional data of the gingiva with the scanning data of the scanning area to determine a first relative position relation between the gingiva and the scanning area; splicing the three-dimensional data of the scanning rod with the scanning data of the scanning area according to the three-dimensional data of the mark point to determine a second relative position relation between the scanning rod and the scanning area; and determining a relative position relation between the gingiva and the scanning rod according to the first relative position relation and the second relative position relation, and splicing the three-dimensional data of the gingiva with the three-dimensional data of the scanning rod according to the relative position relation to acquire the matched data of the gingiva and the scanning rod.

In some embodiments of the present application, through the scanning data of the scanning area, position and pose relations between the gingiva and the scanning rod can be accurately determined, and the three-dimensional data of the gingiva and the three-dimensional data of the mark point are spliced according to the scanning data of the scanning area to acquire the matched data of the gingiva and the scanning rod, so that the splicing accuracy can be improved.

In some embodiments of the present application, the performing the splicing operation on the three-dimensional data of the gingiva and the three-dimensional data of the mark point according to the scanning data of the scanning area to acquire the matched data of the gingiva and the scanning rod may further include:

splicing the three-dimensional data of the gingiva with the scanning data of the scanning area to determine a third relative position relation between the gingiva and the scanning area; performing splicing according to the three-dimensional data of the mark point and the scanning data of the scanning area to determine a fourth relative position relation between the three-dimensional data of the mark point and the scanning area; and determining a relative position relation between the gingiva and the three-dimensional data of the mark point according to the third relative position relation and the fourth relative position relation, and splicing the three-dimensional data of the gingiva with the three-dimensional data of the scanning rod according to the relative position relation to acquire the matched data of the gingiva and the scanning rod.

In some embodiments of the present application, through the scanning data of the scanning area, the position and pose relations between the gingiva and the scanning rod can be accurately determined, and the three-dimensional data of the gingiva and the three-dimensional data of the mark point are spliced according to the scanning data of the scanning area to acquire the matched data of the gingiva and the scanning rod, so that the splicing accuracy can be improved.

In some embodiments of the present application, the method may further include:

displaying first prompt information and second prompt information, where the first prompt information is used for prompting to scan the oral cavity in the first state, and the second prompt information is used for prompting to scan the oral cavity in the second state.

In some embodiments of the present application, by displaying different prompt information in the actual digital modeling process for dental implantation, corresponding prompts can be provided for operations of a doctor, so that the operating efficiency of the doctor can be improved.

In some embodiments of the present application, the method may further include:

converting the matched data acquired after completing the splicing into universal scanning rod data.

In some embodiments of the present application, by converting the matched data to acquire the universal scanning rod data, the compatibility and universality of the data can be improved, so that specially made scanning rod data can be used or processed in a wider range of devices or software platforms.

In some embodiments of the present application, the method may further include:

exporting the matched data as target matched data compatible with target software in a specified format.

In some embodiments of the present application, after acquiring the matched data, the matched data is converted according to formats and coordinate systems compatible with different software, so that the flexibility of data use can be improved.

In a second aspect, embodiments of the present application provide an apparatus for matching gingival data, which includes:

a first acquisition component, configured to acquire first data of an oral cavity in a first state, where the oral cavity in the first state refers to that an implant has been implanted into the oral cavity, and the first data includes three-dimensional data of a gingiva;

a second acquisition component, configured to acquire second data of the oral cavity in a second state, where the oral cavity in the second state refers to that a scanning rod is mounted on the implant in the oral cavity, the second data includes three-dimensional data of a mark point of the scanning rod mounted on the implant and scanning data corresponding to a scanning area, the scanning data comprises data of a gingiva and the mark point of the scanning rod in the scanning area; and a splicing component, configured to perform a splicing operation on the three-dimensional data of the gingiva and the three-dimensional data of the mark point according to the scanning data of the scanning area to acquire matched data of the gingiva and the scanning rod.

In a third aspect, embodiments of the present application provide a computer device, which includes a memory, a processor, and a computer program stored in the memory and runnable in the processor; and when executing the computer program, the processor implements the method provided in the above description.

BRIEF DESCRIPTION OF THE DRAWINGS

To describe the technical schemes in the embodiments of present application more clearly, the accompanying drawings required for describing the embodiments or the prior art will be briefly described below. It is apparent that the accompanying drawings in the following description show merely some embodiments of the present application, and a person of ordinary skill in the art may still derive other drawings from these accompanying drawings without creative efforts.

DETAILED DESCRIPTION

Embodiments of the technical schemes of the present application will be described in detail below in conjunction with the accompanying drawings. The embodiments below are merely used for more clearly describing the technical schemes of the present application, merely as examples, instead of limiting the scope of protection of the present application.

Unless otherwise defined, all technical and scientific terms used herein have the same meaning as that commonly understood by a person skilled in the art in the present application. The terms used herein are merely for the purpose of describing specific embodiments and are not intended to limit the present application. Terms "comprises" and "have" as well as any variation thereof in the specification and claims as well as the description of the drawings in the present application are intended to cover non-exclusive inclusion.

In the description of the embodiments of the present application, the technical terms "first", "second" and the like are merely used for distinguishing one substance or operation from another substance or operation rather than being construed to indicate or imply relative importance or implicitly indicate the quantity, specific order or primary and secondary relations of indicated technical features. In the description of the embodiments of the present application, "a plurality of" means two or more, unless expressly specified otherwise.

Reference to "an embodiment" herein means that particular features, structures, or characteristics described with reference to the embodiment may be included in at least one embodiment of the present application. The phrase appearing at different positions of this specification may not refer to the same embodiment or an independent or alternative embodiment that is mutually exclusive with other embodiments. It can be explicitly and implicitly understood by a person skilled in the art that the embodiments described in the specification can be combined with other embodiments.

Figure 1:
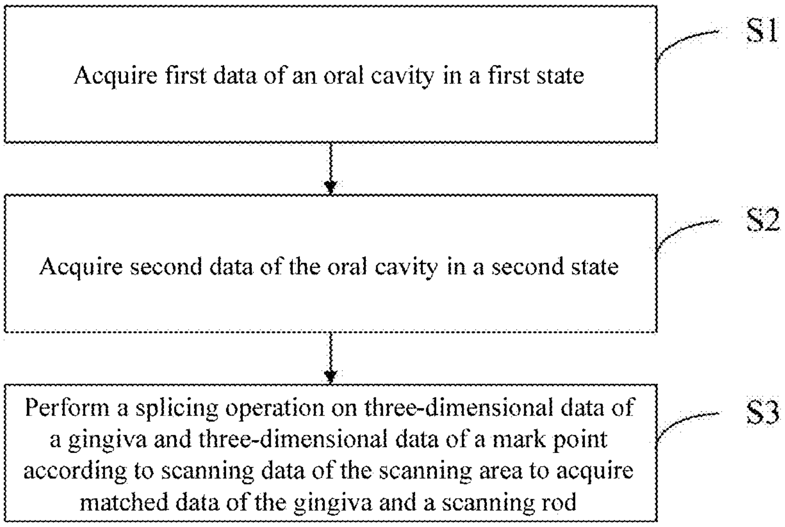
FIG. 1 is a schematic diagram of steps of a method for matching gingival data provided in some embodiments of the present application.

Referring to FIG. 1, FIG. 1 is a schematic diagram of steps of a method for matching gingival data provided in some embodiments of the present application. The method for matching gingival data may include the following steps:

S1, first data of an oral cavity in a first state is acquired.

The oral cavity in the first state refers to a state that an implant has been implanted into the oral cavity. The implant is an artificial teeth root for replacing a missing tooth, may usually be made of a titanium alloy or a ceramic material, and becomes a support of a dental implant. An abutment is mounted on the implant. The abutment is a part in an implanting system for supporting and fixing an upper structure of the implant. A scanning rod is mounted on the implant through the abutment. The first data may include three-dimensional data of a gingiva. The three-dimensional data of the gingiva refers to data of a three-dimensional shape and structure of a gingival tissue obtained through a scanning or measuring technique, and may include information such as thickness, shape, color, and texture of the gingival.

Figure 2:
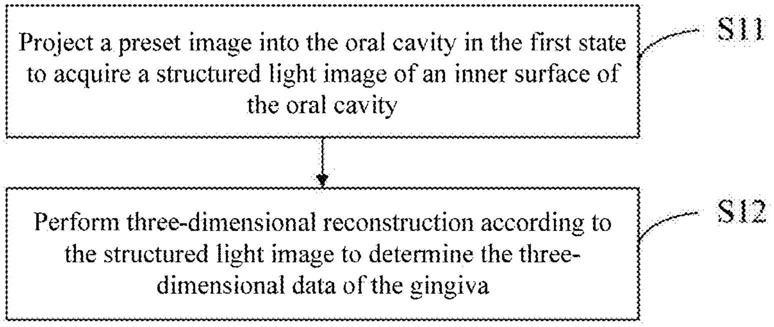
FIG. 2 is a schematic diagram of steps of acquiring first data provided in some embodiments of the present application.

Referring to FIG. 2, FIG. 2 is a schematic diagram of steps of acquiring first data provided in some embodiments of the present application. The step of acquiring the first data may include:

S11, a preset image is projected into the oral cavity in the first state to acquire a structured light image of an inner surface of the oral cavity.

The three-dimensional data of the gingiva can be acquired through an intraoral scanner and a structured light scanning technique. The intraoral scanner is a digital device for acquiring an internal structure of the oral cavity and is usually composed of a handheld or desktop scanner and a related software system. The structured light scanning technique acquires the structured light image of the inner surface of the oral cavity by projecting rays or raster stripes to the inner surface of the oral cavity and capturing deformations of these rays by using a camera or a sensor based on the structured light principle. The camera is usually a black-and-white camera/depth camera. The preset image may include structured light patterns, which may be structured light stripes or rays. The preset image can be projected through a scanner projector and the structured light image of the inner surface of the oral cavity in the current state is acquired through the intraoral scanner.

S12, three-dimensional reconstruction is performed according to the structured light image to determine the three-dimensional data of the gingival.

Figure 3:
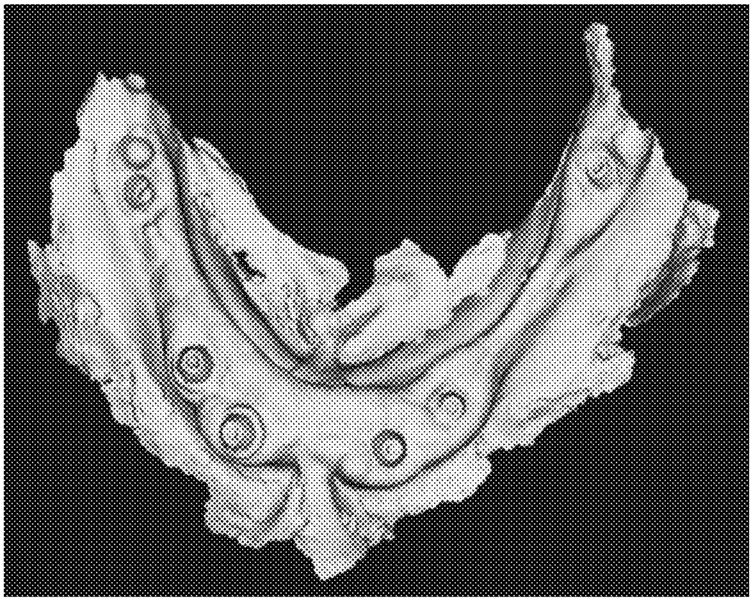
FIG. 3 is a schematic diagram of three-dimensional data of a gingiva provided in some embodiments of the present application.

Referring to FIG. 3, FIG. 3 is a schematic diagram of three-dimensional data of a gingiva provided in some embodiments of the present application.

After the structured light image of the inner surface of the oral cavity is acquired, three-dimensional reconstruction is performed according to the structured light image of the inner surface of the oral cavity to acquire point cloud data characterizing the inner surface of the oral cavity, where each point in the point cloud data represents a position of the inner surface of the oral cavity.

The three-dimensional data of the gingiva can be determined by analyzing and processing the point cloud data. The step of analyzing and processing the point cloud data may include steps of point cloud generation, point cloud filtering, and determination of the three-dimensional data of the gingiva. Point cloud generation is to triangularize pixels in the structured light image to generate three-dimensional point cloud data. The point cloud data includes shape and structure information on surfaces of the tooth and the gingiva. Point cloud filtering is to filter the generated point cloud data to remove noisy points and abnormal values therein, so as to make the point cloud data more accurate and reliable. Determination of the three-dimensional data of the gingiva may be to determine the three-dimensional data of the gingival by way of feature extraction, surface fitting, and the like. The three-dimensional data of the gingiva may include thickness, shape, and the like of the gingiva.

In some embodiments of the present application, by way of acquiring the first data of the oral cavity through the structured light technique, the precision of the acquired first data of the oral cavity can be improved by actively projecting the preset image and combining with data processing.

S2, second data of the oral cavity in a second state is acquired.

The oral cavity in the second state refers to a state that a scanning rod is mounted on the implant in the oral cavity. The scanning rod is a device for oral scanning and mainly used for three-dimensional scanning of the interior of the oral cavity to acquire digital data of the tooth, the gingiva and other structures in the oral cavity.

The second data includes three-dimensional data of a mark point of the scanning rod mounted on the implant and scanning data corresponding to a scanning area.

Mark points are some special points or marks on the scanning rod, which may be bright or colored form points. A plurality of mark points may be provided on one scanning rod and distributed at different positions of the scanning rod to provide enough information to determine a position and a pose of the scanning rod.

The scanning data includes data of a gingiva and the mark point of the scanning rod in the scanning area, where the scanning area can simultaneously scan the scanning rod and the gingival. In some embodiments of the present disclosure, the scanning area can simultaneously cover the mark point of a same scanning rod and a gingival, and the gingival is a gingival located in an intersecting coherent region between the scanning area and the scanning rod and within a pre-set range, and an area of the pre-set range is greater than an area of the intersecting coherent region. Or, the scanning area may refers to a connection point between the scanning rod mounted on the implant and the gingiva.

Figure 4:
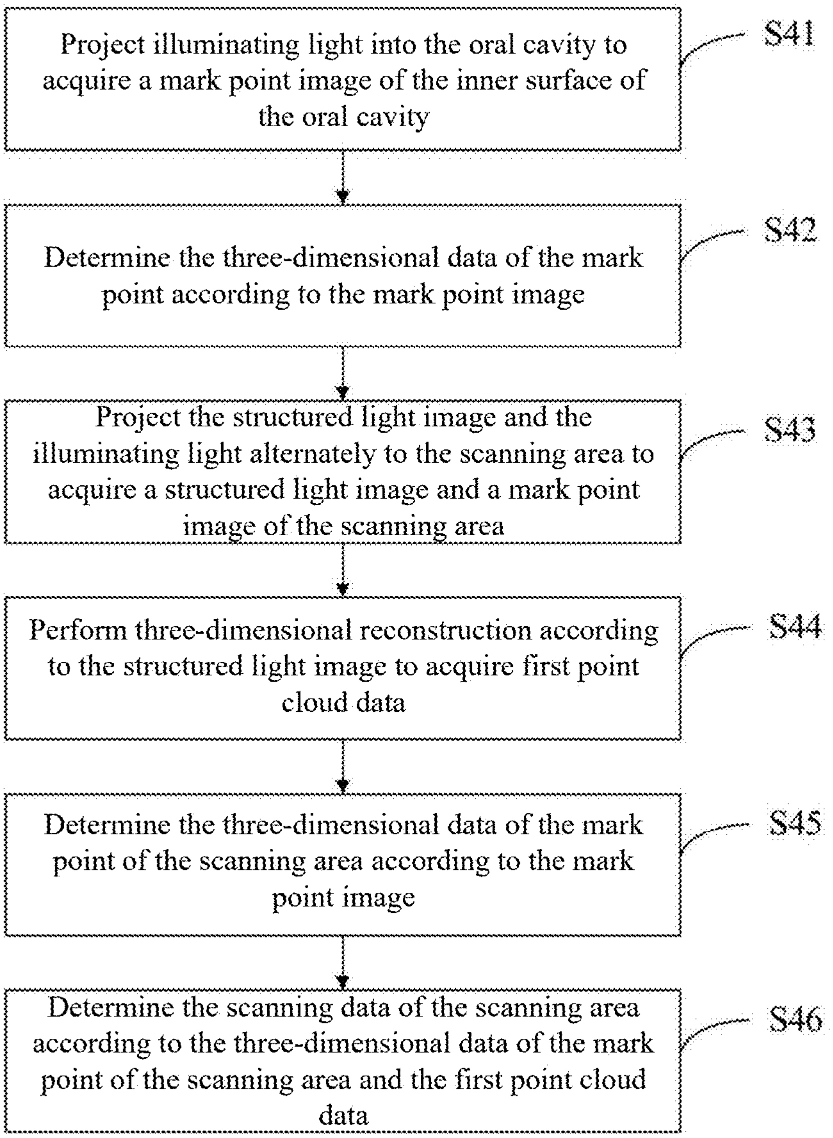
FIG. 4 is a schematic diagram of steps of a first way of acquiring second data provided in some embodiments of the present application.

Referring to FIG. 4, FIG. 4 is a schematic diagram of steps of a first way of acquiring second data provided in some embodiments of the present application. The steps of acquiring the second data in this way may include:

S41, illuminating light is projected into the oral cavity to acquire a mark point image of the inner surface of the oral cavity.

The illuminating light is not the structured light in the above description but illumination light without patterns. The illuminating light may be either white light or illumination light with other colors. The mark point image of the inner surface of the oral cavity may be acquired by the black-and-white camera or depth camera.

S42, three-dimensional data of the mark point is determined according to the mark point image.

By acquiring the mark point image of the inner surface of the oral cavity, it is convenient to extract the mark points from the mark point image and three-dimensional reconstruction is performed on the mark points to acquire the three-dimensional data of the mark point.

S43, the structured light image and the illuminating light are projected alternately to the scanning area to acquire a structured light image and a mark point image of the scanning area.

Since the scanning data includes data of a gingiva and the mark point of the scanning rod in the scanning area, the structured light image and the mark point image of the scanning area can be acquired by simultaneously using the structured light scanning technique and the photogrammetric technology.

To project the structured light image and the illuminating light alternately to the scanning area may be to project one frame of the structured light image first and then project one frame of the illuminating light, and may also be to project a plurality of frames of the structured light image first and then project a plurality of frames of the illuminating light. The number of frames of the projected illuminating light and structured light image may be either consistent or inconsistent, as long as corresponding structured light images and mark point images can be acquired in an actual implementation process.

When the structured light image and the mark point image of the scanning area are acquired, by alternately projecting the structured light image and the illuminating light for illumination to the scanning area, the structured light image of the scanning area is acquired through the structured light scanning technique; and by projecting the illuminating light to the scanning area, the three-dimensional data of the mark point is acquired based on the photogrammetric technology, and the mark point image of the scanning area is acquired through the black-and-white camera/depth camera.

In some other embodiments of the present application, in the case of low precision requirement on the three-dimensional data of the mark point, a color texture camera may also be used to replace the black-and-white camera/depth camera in the above step to collect the mark point image, and three-dimensional reconstruction is performed on the mark point image to acquire the three-dimensional data of the mark point. The mark point image acquired by the color texture camera may also be used as a texture image for texture mapping with the three-dimensional data to acquire a true color three-dimensional model.

In some other embodiments of the present application, corresponding three-dimensional data of the gingiva may be acquired from the three-dimensional data of the inner surface of the oral cavity in a gingival region of a non-connecting portion, and the three-dimensional data of the mark point can only be acquired through the photogrammetric technology in a scanning rod region of the non-connecting portion.

S44, first point cloud data is acquired by performing three-dimensional reconstruction according to the structured light image.

After the structured light image of the scanning area is acquired, three-dimensional reconstruction is performed according to the structured light image of the scanning area to acquire the first point cloud data characterizing a surface of the scanning area, where each point in the first point cloud data represents a position of the surface of the scanning area.

S45, the three-dimensional data of the mark point of the scanning area is determined according to the mark point image.

Figure 5:
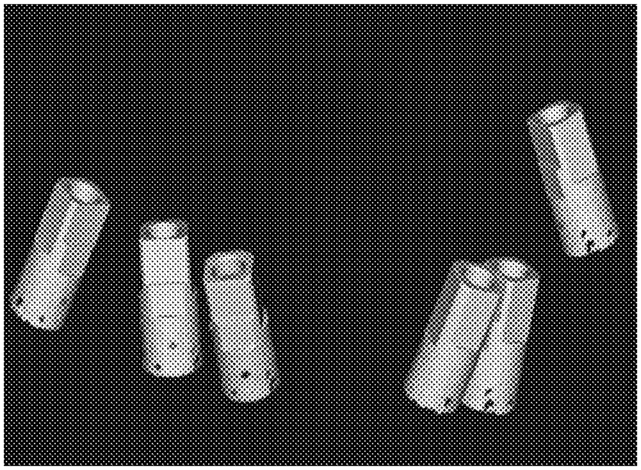
FIG. 5 is a schematic diagram of three-dimensional data of a mark point of the scanning area provided in some embodiments of the present application.

Referring to FIG. 5, FIG. 5 is a schematic diagram of three-dimensional data of a mark point of the scanning area provided in some embodiments of the present application.

After the mark point image is acquired through the black-and-white camera/depth camera, the mark point image can be sent to a computer device, and the computer device performs texture mapping on the three-dimensional model of the scanning area and the mark point image to determine the three-dimensional data of the mark point of the scanning area. Here, the three-dimensional data of the mark point of the scanning area is a part of the scanning data of the scanning area and is not identical to the three-dimensional data of the mark point in the above description. The three-dimensional data of the mark point in the above description is three-dimensional data only including the mark point portion, while the scanning data of the scanning area includes data of a gingiva and the mark point of the scanning rod in the scanning area, and the three-dimensional data of the mark point of the scanning area is a part of the scanning data.

S46, the scanning data of the scanning area is determined according to the three-dimensional data of the mark point of the scanning area and the first point cloud data.

Figure 6:
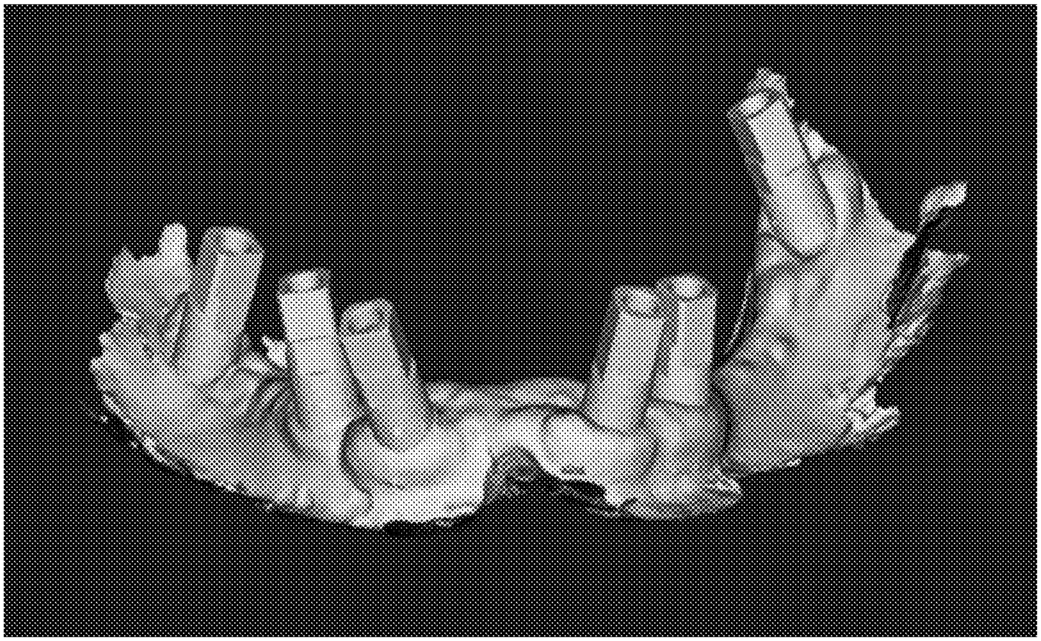
FIG. 6 is a schematic diagram of scanning data of the scanning area provided in some embodiments of the present application.

Referring to FIG. 6, FIG. 6 is a schematic diagram of scanning data of the scanning area provided in some embodiments of the present application.

After the first point cloud data and the three-dimensional data of the mark point of the scanning area are acquired, the first point cloud data and the three-dimensional data of the mark point are matched to acquire the scanning data of the scanning area.

In some embodiments of the present application, the scanning data of the scanning area is determined through acquiring, processing, and matching of the structured light and the mark point image as well as point cloud processing and algorithm. The structured light image and the mark point image of the scanning area are acquired through the structured light scanning technique and the photogrammetric technology, the first point cloud data characterizing the surface of the scanning area is acquired by performing three-dimensional reconstruction according to the structured light image, the three-dimensional data of the mark point of the scanning area is acquired by performing three-dimensional reconstruction on the mark point image, and finally, the first point cloud data and the three-dimensional data of the mark point of the scanning area are matched to acquire intact scanning data of the scanning area. Therefore, the accuracy of acquiring the scanning data of the scanning area is improved.

Figure 7:
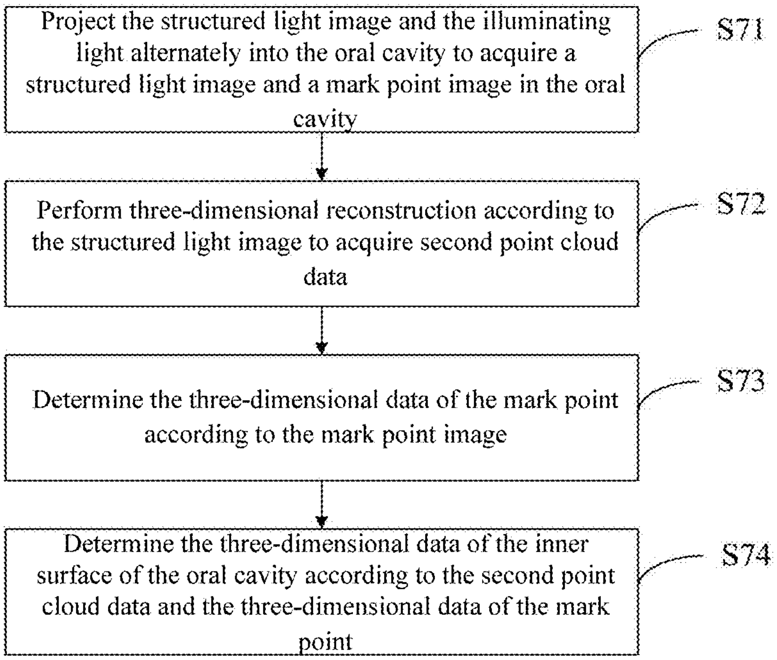
FIG. 7 is a schematic diagram of steps of a second way of acquiring second data provided in some embodiments of the present application.

In some other embodiments of the present application, referring to FIG. 7, FIG. 7 is a schematic diagram of steps of a second way of acquiring second data provided in some embodiments of the present application. The steps of acquiring the second data in this way may include:

S71, the structured light image and the illuminating light are projected alternately into the oral cavity to acquire a structured light image and a mark point image in the oral cavity.

To project the structured light image and the illuminating light alternately into the oral cavity may be to project one frame of the structured light image first and then project one frame of the illuminating light, and may also be to project a plurality of frames of the structured light image first and then project a plurality of frames of the illuminating light. The number of frames of the projected illuminating light and structured light image may be either consistent or inconsistent, as long as corresponding structured light images and mark point images can be acquired in an actual implementation process.

Because the scanning rod is mounted in the oral cavity in this state, the three-dimensional data in the oral cavity includes both the three-dimensional data of the gingiva and the three-dimensional data of the mark point on the scanning rod, so that the structured light image and the mark point image in the oral cavity can be acquired by simultaneously using the structured light scanning technique and the photogrammetric technology.

When the structured light image and the mark point image in the oral cavity are acquired, by alternately projecting the structured light image and the illuminating light for illumination to the oral cavity, the structured light image in the oral cavity is acquired through the structured light scanning technique; and by projecting the illuminating light into the oral cavity, the three-dimensional data of the mark point is acquired based on the photogrammetric technology, and image of the reference mark point on the inner surface of the oral cavity is acquired through the black-and-white camera/depth camera.

S72, three-dimensional reconstruction is performed according to the structured light image to acquire second point cloud data.

After the structured light image in the oral cavity is acquired, three-dimensional reconstruction is performed according to the structured light image in the oral cavity to acquire the second point cloud data characterizing the inner surface of the oral cavity, where each point in the second point cloud data represents a position of the inner surface of the oral cavity.

S73, the three-dimensional data of the mark point is determined according to the mark point image.

After the mark point image in the oral cavity is acquired, the mark point image is sent to the computer device, and the computer device performs three-dimensional reconstruction through the mark point image to determine the three-dimensional data of the mark point in the oral cavity.

S74, the three-dimensional data of the inner surface of the oral cavity is determined according to the second point cloud data and the three-dimensional data of the mark point.

After the second point cloud data and the three-dimensional data of the mark point in the oral cavity are acquired, the second point cloud data and the three-dimensional data of the mark point in the oral cavity are matched to acquire the three-dimensional data of the inner surface of the oral cavity, where the three-dimensional data of inner surface of the oral structure includes the scanning data of the scanning area.

In some embodiments of the present application, the three-dimensional data of the inner surface of the oral cavity is determined through acquiring, processing, and matching of the structured light and the mark point image as well as point cloud processing and algorithm. The structured light image and the mark point image of the inner surface of the oral cavity are acquired through the structured light scanning technique and the photogrammetric technology, the second point cloud data characterizing the inner surface of the oral cavity is acquired by performing three-dimensional reconstruction according to the structured light image, the three-dimensional data of the mark point in the oral cavity is acquired by performing three-dimensional reconstruction according to the mark point image, and finally, the second point cloud data and the three-dimensional data of the mark point in the oral cavity are matched to acquire intact three-dimensional data in the oral cavity. The three-dimensional data in the oral cavity includes the scanning data of the scanning area. Therefore, the accuracy of acquiring the scanning data of the scanning area can be improved.

S3, a splicing operation is performed on the three-dimensional data of the gingiva and the three-dimensional data of the mark point according to the scanning data of the scanning area to acquire matched data of the gingiva and the scanning rod.

Figure 8:
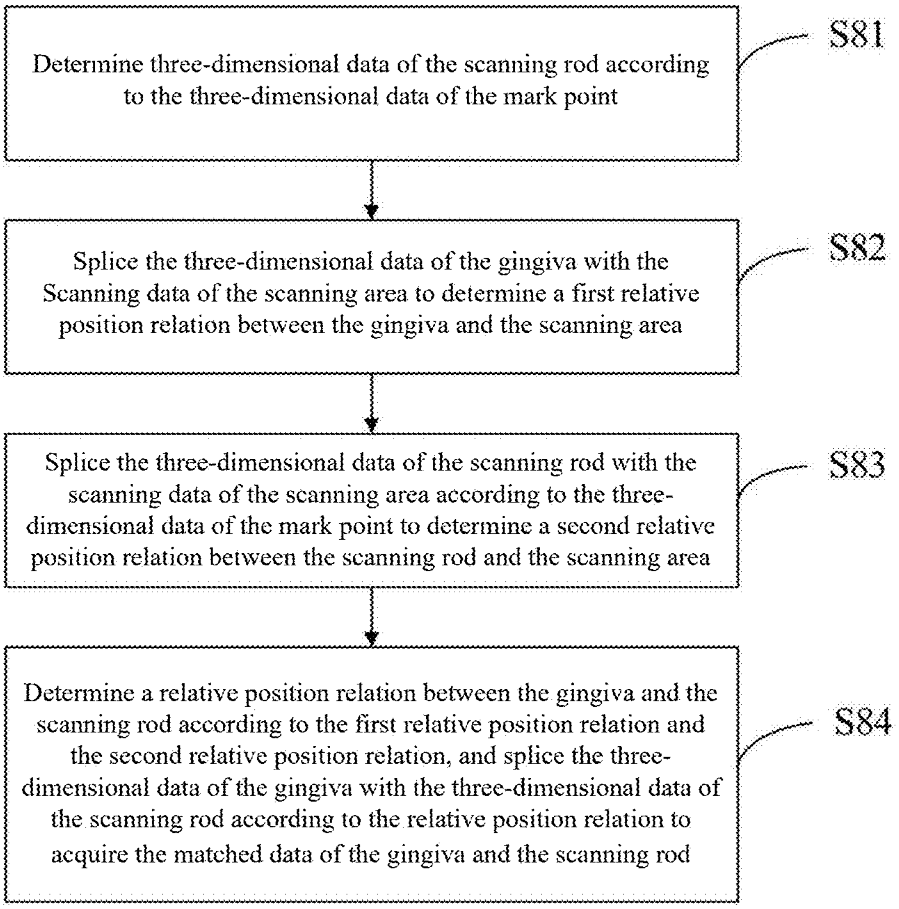
FIG. 8 is a schematic diagram of steps of acquiring matched data of a gingiva and a scanning rod in the first way of acquiring the second data provided in some embodiments of the present application.

Referring to FIG. 8, FIG. 8 is a schematic diagram of steps of acquiring matched data of a gingiva and a scanning rod in the first way of acquiring the second data provided in some embodiments of the present application. The steps may include:

S81, three-dimensional data of the scanning rod is determined according to the three-dimensional data of the mark point.

By comparing three-dimensional coordinates of the mark point in the three-dimensional data of the mark point in a preset three-dimensional model of the scanning rod, for example, using a point cloud registration algorithm such as an iterative closet point (ICP) algorithm, the three-dimensional coordinates of the mark point and a corresponding point of the scanning rod model are matched to determine a position and a pose of the scanning rod according to the three-dimensional data of the mark point, so as to determine the three-dimensional data of the scanning rod.

S82, the three-dimensional data of the gingiva is spliced with the scanning data of the scanning area to determine a first relative position relation between the gingiva and the scanning area.

Exemplarily, the three-dimensional data of the gingiva and scanning data of the scanning area are aligned, for example, represented in a same coordinate system. The two groups of point cloud data can be aligned by using the point cloud registration algorithm such as ICP algorithm.

A region corresponding to the gingiva is found in the point cloud data of the scanning area, and the point cloud data of the gingiva and the point cloud data of the scanning area are spliced according to geometrical characteristics of adjacent point clouds. Specifically, a splicing position can be in smooth transition by using surface fitting or an interpolation algorithm.

The relative position relation between the gingiva and the scanning area can be determined according to the spliced data. Specifically, the first relative position relation between the gingiva and the scanning area can be acquired by calculating geometrical characteristics such as a distance between the point cloud data of the gingiva and the point cloud data of the scanning area and normal vectors.

S83, the three-dimensional data of the scanning rod is spliced with the scanning data of the scanning area according to the three-dimensional data of the mark point to determine a second relative position relation between the scanning rod and the scanning area.

Exemplarily, the second relative position relation between the scanning rod and the scanning area can be determined based on the data splicing step as same as the previous step.

S84, a relative position relation between the gingiva and the scanning rod is determined according to the first relative position relation and the second relative position relation, and the three-dimensional data of the gingiva is spliced with the three-dimensional data of the scanning rod according to the relative position relation to acquire the matched data of the gingiva and the scanning rod.

After the first relative position relation between the gingiva and the scanning area and the second relative position relation between the scanning rod and the scanning area are respectively acquired, the three-dimensional data of the gingiva and the three-dimensional data of the scanning rod can be spliced based on the scanning data of the scanning area to acquire the matched data of the gingiva and the scanning rod.

In the above implementation process, through the scanning data of the scanning area, position and pose relations between the gingiva and the scanning rod can be accurately determined, and the three-dimensional data of the gingiva and the three-dimensional data of the mark point are spliced according to the scanning data of the scanning area to acquire the matched data of the gingiva and the scanning rod, so that the splicing accuracy can be improved.

Figure 9:
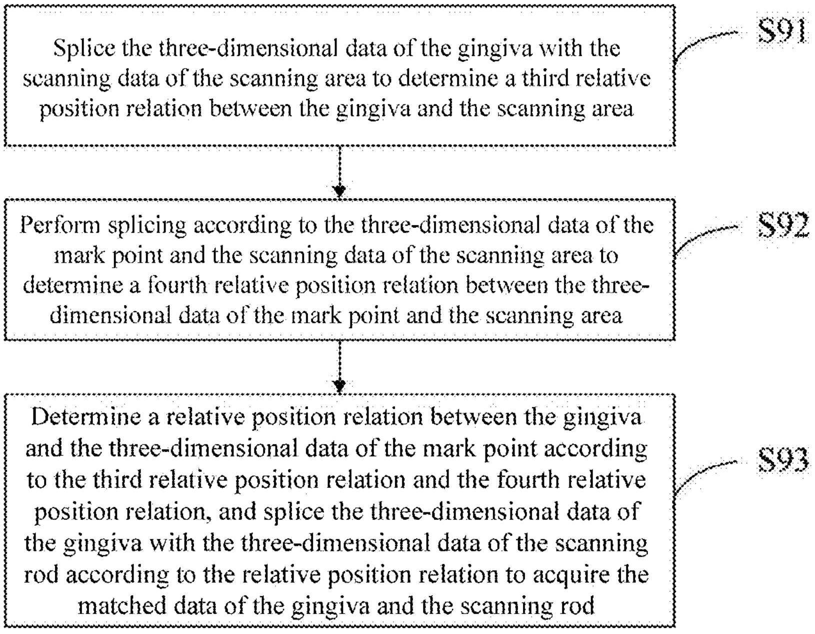
FIG. 9 is a schematic diagram of steps of acquiring matched data of a gingiva and a scanning rod in the second way of acquiring the second data provided in some embodiments of the present application.

In another embodiment of the present application, referring to FIG. 9, FIG. 9 is a schematic diagram of steps of acquiring matched data of a gingiva and a scanning rod in the second way of acquiring the second data provided in some embodiments of the present application. The steps may include:

S91, the three-dimensional data of the gingiva is spliced with the scanning data of the scanning area to determine a third relative position relation between the gingiva and the scanning area.

Exemplarily, the three-dimensional data of the gingiva and scanning data of the scanning area are aligned, making them represented in a same coordinate system. The two groups of point cloud data can be aligned by using the point cloud registration algorithm such as ICP algorithm.

A region corresponding to the gingiva is found in the point cloud data of the scanning area, and the point cloud data of the gingiva and the point cloud data of the scanning area are spliced according to geometrical characteristics of adjacent point clouds. Specifically, a splicing position can be in smooth transition by using surface fitting or an interpolation algorithm.

The relative position relation between the gingiva and the scanning area can be determined according to the spliced data. Specifically, the third relative position relation between the gingiva and the scanning area can be acquired by calculating geometrical characteristics such as a distance between the point cloud data of the gingiva and the point cloud data of the scanning area and normal vectors.

S92, splicing is performed according to the three-dimensional data of the mark point and the scanning data of the scanning area to determine a fourth relative position relation between the three-dimensional data of the mark point and the scanning area.

Exemplarily, the fourth relative position relation between the three-dimensional data of the mark point and the scanning area can be determined based on the data splicing step as same as the previous step.

S93, a relative position relation between the gingiva and the three-dimensional data of the mark point is determined according to the third relative position relation and the fourth relative position relation, and the three-dimensional data of the gingiva is spliced with the three-dimensional data of the scanning rod according to the relative position relation to acquire the matched data of the gingiva and the scanning rod.

After the third relative position relation between the gingiva and the scanning area and the fourth relative position relation between the three-dimensional data of the mark point and the scanning area are respectively acquired, the three-dimensional data of the gingiva and the three-dimensional data of the scanning rod can be spliced based on the scanning data of the scanning area included in the three-dimensional data of the inner surface of the oral cavity to acquire the matched data of the gingiva and the scanning rod.

In the above implementation process, through the scanning data of the scanning area, the position and pose relations between the gingiva and the scanning rod can be accurately determined, and the three-dimensional data of the gingiva and the three-dimensional data of the mark point are spliced according to the scanning data of the scanning area to acquire the matched data of the gingiva and the scanning rod, so that the splicing accuracy can be improved.

In some embodiments of the present application, the method for matching gingival data may further include:

first prompt information and second prompt information are displayed, where the first prompt information is used for prompting to scan the oral cavity in the first state, and the second prompt information is used for prompting to scan the oral cavity in the second state.

Exemplarily, the method for matching gingival data may be applied to a computer device, where the computer device may be a universal computer, a special-purpose computer, a mobile phone, a notebook computer, a tablet personal computer or another programmable device for executing the steps in the method for matching gingival data. In an actual application scene, the computer device can display the prompt information in the digital modeling process for dental implantation to prompt a doctor to perform corresponding operations, for example, display the first prompt information to prompt the doctor to scan the oral cavity of a patent in the first state and process the scanning data correspondingly or display the second prompt information to prompt the doctor to scan the oral cavity of the patent in the second state and process the scanning data correspondingly.

In the above implementation process, by displaying different prompt information in the actual digital modeling process for dental implantation, corresponding prompts can be provided for operations of the doctor, so that the operating efficiency of the doctor can be improved.

In some embodiments of the present application, the method for matching gingival data may further include: the matched data acquired after completing the splicing is converted into universal scanning rod data.

Because a specially made scanning rod provided with the mark points is used for acquiring the data of the mark point, the matched data acquired is also data of the corresponding specially made scanning rod. Therefore, by converting the matched data through the computer device to acquire the universal scanning rod data, the compatibility and universality of the data can be improved, so that specially made scanning rod data can be used or processed in a wider range of devices or software platforms.

In some embodiments of the present application, the method for matching gingival data may further include: the matched data is exported as target matched data compatible with target software in a specified format.

Because there may be differences between the formats and the coordinate systems compatible with software used in different dental departments, the computer device can convert the matched data according to the formats and coordinate systems compatible with different software after acquiring the matched data, so that the flexibility of data use can be improved.

To sum up, the method for matching gingival data provided in the embodiments of the present application can realize scanning and matching of the gingiva and the scanning rod on a same device to complete the entire digital modeling process for dental implantation on the same device without extra data importing and exporting, so that the modeling efficiency in the implanting digital modeling process can be improved. Moreover, by precisely aligning the three-dimensional data of the gingiva with the three-dimensional data of the mark point, the accuracy of the matched data of the gingiva and the scanning rod can be improved.

Figure 10:
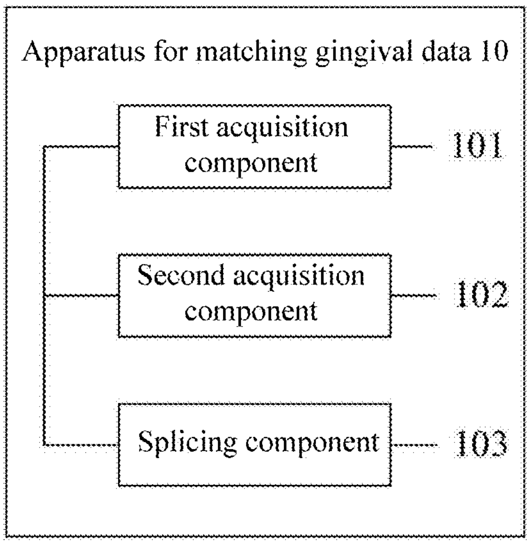
FIG. 10 is a schematic structural diagram of an apparatus for matching gingival data provided in some embodiments of the present application.

FIG. 10 is a schematic structural diagram of an apparatus for matching gingival data provided in some embodiments of the present application. The apparatus may be implemented as part of or entire of the computer device through software, hardware or a combination of software and hardware. The computer device may be a computer device shown in FIG. 11 below. Referring to FIG. 10, the apparatus for matching gingival data 10 may include: a first acquisition component 101, a second acquisition component 102, and a splicing component 103.

In the embodiments of the present application, the first acquisition component 101 is configured to acquire first data of an oral cavity in a first state, where the oral cavity in the first state refers to that an implant has been mounted on a gingiva in the oral cavity, and the first data includes three-dimensional data of the gingiva.

The second acquisition component 102 is configured to acquire second data of the oral cavity in a second state, where the oral cavity in the second state refers to that a scanning rod is mounted on the implant in the oral cavity, the second data includes three-dimensional data of a mark point of the scanning rod mounted on the implant and scanning data corresponding to a scanning area, the scanning data comprises data of a gingiva and the mark point of the scanning rod in the scanning area, where the scanning area can simultaneously scan the scanning rod and the gingival. In some embodiments of the present disclosure, the scanning area can simultaneously cover the mark point of a same scanning rod and a gingival, and the gingival is a gingival located in an intersecting coherent region between the scanning area and the scanning rod and within a pre-set range, and an area of the pre-set range is greater than an area of the intersecting coherent region. Or, the scanning area may refers to a connection point between the scanning rod mounted on the implant and the gingiva.

The splicing component 103 is configured to perform a splicing operation on the three-dimensional data of the gingiva and the three-dimensional data of the mark point according to the scanning data of the scanning area to acquire matched data of the gingiva and the scanning rod.

In some embodiments of the present application, the first acquisition component 101 may be specifically configured to:

project a preset image into the oral cavity in the first state to acquire a structured light image of an inner surface of the oral cavity; and perform three-dimensional reconstruction according to the structured light image to determine the three-dimensional data of the gingiva.

In some embodiments of the present application, the second acquisition component 102 may be specifically configured to: project illuminating light into the oral cavity to acquire a mark point image of the inner surface of the oral cavity; determine the three-dimensional data of the mark point according to the mark point image; project the structured light image and the illuminating light alternately to the scanning area to acquire a structured light image and a mark point image of the scanning area; perform three-dimensional reconstruction according to the structured light image to acquire first point cloud data; determine the three-dimensional data of the mark point of the scanning area according to the mark point image; and determine the scanning data of the scanning area according to the three-dimensional data of the mark point of the scanning area and the first point cloud data.

In some embodiments of the present application, the second acquisition component 102 may further be specifically configured to:

project the structured light image and the illuminating light alternately into the oral cavity to acquire a structured light image and a mark point image in the oral cavity; perform three-dimensional reconstruction according to the structured light image to acquire second point cloud data; determine the three-dimensional data of the mark point according to the mark point image; and determine the three-dimensional data of the inner surface of the oral cavity according to the second point cloud data and the three-dimensional data of the mark point.

In some embodiments of the present application, the splicing component 103 may be specifically configured to:

determine three-dimensional data of the scanning rod according to the three-dimensional data of the mark point; splice the three-dimensional data of the gingiva with the scanning data of the scanning area to determine a first relative position relation between the gingiva and the scanning area; splice the three-dimensional data of the scanning rod with the scanning data of the scanning area according to the three-dimensional data of the mark point to determine a second relative position relation between the scanning rod and the scanning area; and determine a relative position relation between the gingiva and the scanning rod according to the first relative position relation and the second relative position relation, and splice the three-dimensional data of the gingiva with the three-dimensional data of the scanning rod according to the relative position relation to acquire the matched data of the gingiva and the scanning rod.

In some embodiments of the present application, the splicing component 103 may further be specifically configured to:

splice the three-dimensional data of the gingiva with the scanning data of the scanning area to determine a third relative position relation between the gingiva and the scanning area; perform splicing according to the three-dimensional data of the mark point and the scanning data of the scanning area to determine a fourth relative position relation between the three-dimensional data of the mark point and the scanning area; and determine a relative position relation between the gingiva and the three-dimensional data of the mark point according to the third relative position relation and the fourth relative position relation, and splice the three-dimensional data of the gingiva with the three-dimensional data of the scanning rod according to the relative position relation to acquire the matched data of the gingiva and the scanning rod.

In some embodiments of the present application, the apparatus for matching gingival data 10 may further include a display component, which is configured to display first prompt information and second prompt information, where the first prompt information is used for prompting to scan the oral cavity in the first state, and the second prompt information is used for prompting to scan the oral cavity in the second state.

In some embodiments of the present application, the apparatus for matching gingival data 10 may further include a data processing component, which is configured to convert the matched data acquired after completing the splicing into universal scanning rod data.

In some embodiments of the present application, the data processing component may further be configured to export the matched data as target matched data compatible with target software in a specified format.

It should be noted that when the apparatus for matching gingival data provided in the above embodiment identifies faults of a target instrument, only division of the above functional components is used as an example for description. In practical applications, the above functions can be allocated to and completed by different functional components according to requirements. That is, an internal structure of the apparatus is divided into different functional components to complete all or some of the functions described above.

The functional units and components in the embodiments may be all integrated into one processing unit, may also physically exist separately, or may be integrated into one unit by two or more units. The above integrated unit can be implemented in the form of hardware or in the form of software functional units. In addition, the specific names of the functional units and components are only for the convenience of distinguishing each other, and are not intended to limit the scope of protection of the embodiments of the present application.

The apparatus for matching gingival data provided in the above embodiment and the method for matching gingival data embodiment belong to the same concept. Specific working processes of units and components in the above embodiments and technical effects brought thereby may refer to the method embodiments, and details are not described herein again.

Figure 11:
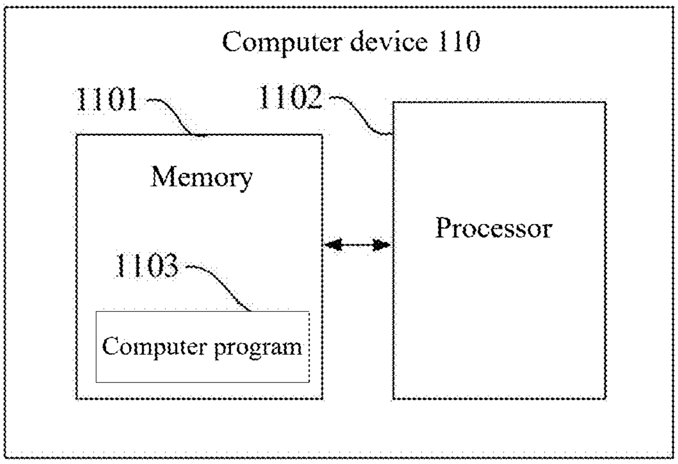
FIG. 11 is a schematic diagram of a computer device provided by the present application.

The embodiments of the present application further provide a computer device. Referring to FIG. 11, FIG. 11 is a schematic diagram of a computer device provided by the present application. The computer device 110 includes: a memory 1101, a processor 1102, and a computer program 1103 stored in the memory 1101 and runnable in the processor 1102, where when implementing the computer program, the processor 1102 implements the steps in the various method embodiments.

The computer device 110 may be a universal computer device or a special purpose computer device. In a specific implementation, the computer device 110 may be a desktop computer, a portable computer, a network server, a palmtop computer, a mobile phone, a tablet personal computer, a wireless terminal device, a communication device, or an embedded device. In the embodiment of the present application, the type of the computer device 110 is not limited. A person skilled in the art may understand that FIG. 11 is merely an example of the computer device 110 and does not constitute a limitation to the computer device 110. The computer device may include more or less components than components shown in the figure or combine some components or include different components, for example, may further include an input and output device, a network access device and the like.

The processor 1102 may be a Central Processing Unit (CPU). The processor 1102 may also be another universal processor, a Digital Signal Processor (DSP), an Application Specific Integrated Circuit (ASIC), a Field Programmable Gate Array (FPGA) or another programmable logical device, a discrete gate or transistor logical device, a discrete hardware component, and the like. The universal processor may be a microprocessor or may also be any conventional processor.

In some embodiments of the present application, the memory 1101 may be an internal storage unit of the computer device 110, for example, a hard disc or an internal storage of the computer device 110. In some embodiments of the present application, the memory 1101 may also be an external storage device of the computer device 110, for example, a plug-in hard disc, a Smart Media Card (SMC), a Secure Digital (SD) card, a Flash Card (FC), and the like equipped on the computer device 110. Further, the memory 1101 may include both the internal memory unit and the external storage device of the computer device 110. The memory 1101 is configured to store operating systems, applications, Boot Loaders (BL), data, other programs and the like. The memory 1101 may further be configured to temporarily store data that has been outputted or is to be outputted.

Based on the same application concept, the embodiments of the present application further provide a computer-readable storage medium. The computer-readable storage medium has a computer program stored therein, where, when executed by the processor, the computer program may implement the steps in the above various method embodiments.

The above computer-readable storage medium may be various media capable of storing program codes, for example, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM) and the like. The storage medium is configured to store a program. Upon receiving an execution instruction, the processor executes the program. The method executed by an electronic terminal defined in a process disclosed in any one of the above embodiments of the present invention may be applied to the processor or implemented by the processor.

In the embodiments provided by the present application, it should be understood that the disclosed apparatus and method may be implemented in other manners. The above described apparatus embodiment is merely an example. For example, the unit division is merely a logical function division and there may be other division manners during actual implementations. For another example, a plurality of units or components may be combined or integrated into another system, or some features may be ignored or not performed. In addition, the shown or discussed mutual couplings or direct couplings or communication connection points may be implemented by using some communication interfaces. The indirect couplings or communication connection points between the apparatuses or units may be implemented in electronic, mechanical, or other forms.

It should be understood that for contents about information interaction, execution process and the like between the apparatuses/units, the specific functions thereof and technical effects brought thereby can refer to the method embodiments for detail, because they are based on the same concept as the method embodiments of the present, and details are not described herein again. For the objective of convenient and brief description, only division of the above functional units and components is used as an example for description. In practical applications, the above functions can be allocated to and completed by different functional units and components according to requirements. That is, an internal structure of the apparatus is divided into different functional units or components to complete all or some of the functions described above. The functional units and components in the embodiments may be all integrated into one processing unit, may also physically exist separately, or may be integrated into one unit by two or more units. The above integrated unit can be implemented in the form of hardware or in the form of software functional units. In addition, the specific names of the functional units and components are only for the convenience of distinguishing each other, and are not intended to limit the scope of protection of the present application. For specific working processes of the units and components in the above system, reference may be made to the corresponding processes in the foregoing method embodiments. Details are not described herein again.

Alternatively, it may be implemented in whole or in part through software, hardware, firmware, or any combination thereof. When implemented using software, it can be fully or partially implemented in the form of a computer program product. The computer program product includes one or more computer instructions. When the computer program instruction is loaded and executed on a computer, the flows or functions according to the embodiments of the present invention are generated in whole or in part.

The computer may be a general purpose computer, a dedicated computer, a computer network, or another programmable device. The computer instruction may be stored in a computer-readable storage medium, or transmitted from one computer-readable storage medium to another computer-readable storage medium. For example, the computer instruction is transmitted from one website, computer, server or data center via wired (such as coaxial cable, optical fiber and digital subscriber line (DSL)) or wireless (such as infrared, wireless and microwave) modes to another website, computer, server or data center.

The above description is merely embodiments of the present application and is not intended to limit the scope of protection of the present application. For a person skilled in the art, various alternations and changes can be made on the present application. Any amendments, equivalent replacements, improvements, etc., made within the spirit and principles of the present application shall be included in the scope of protection of the present application.

What is claimed is:

1. A method for matching gingival data, comprising:

acquiring first data of an oral cavity in a first state, wherein the oral cavity in the first state refers to that an implant has been implanted into the oral cavity, and the first data comprises three-dimensional data of a gingiva;

acquiring second data of the oral cavity in a second state, wherein the oral cavity in the second state refers to that a scanning rod is mounted on the implant in the oral cavity, the second data comprises three-dimensional data of a mark point of the scanning rod mounted on the implant and scanning data corresponding to a scanning area, the scanning data comprises data of a gingiva and the mark point of the scanning rod in the scanning area; wherein acquiring the second data comprises: projecting illuminating light into the oral cavity to acquire a mark point image of an inner surface of the oral cavity; determining the three-dimensional data of the mark point according to the mark point image; projecting a structured light image and the illuminating light alternately to the scanning area to acquire a structured light image and a mark point image of the scanning area; performing three-dimensional reconstruction according to the structured light image to acquire first point cloud data; determining the three-dimensional data of the mark point of the scanning area according to the mark point image; and determining the scanning data of the scanning area according to the three-dimensional data of the mark point of the scanning area and the first point cloud data; and performing a splicing operation on the three-dimensional data of the gingiva and the three-dimensional data of the mark point according to the scanning data of the scanning area to acquire matched data of the gingiva and the scanning rod;

wherein the performing the splicing operation on the three-dimensional data of the gingiva and the three-dimensional data of the mark point according to the scanning data of the scanning area to acquire the matched data of the gingiva and the scanning rod comprises: determining three-dimensional data of the scanning rod according to the three-dimensional data of the mark point; splicing the three-dimensional data of the gingiva with the scanning data of the scanning area to determine a first relative position relation between the gingiva and the scanning area; splicing the three-dimensional data of the scanning rod with the scanning data of the scanning area according to the three-dimensional data of the mark point to determine a second relative position relation between the scanning rod and the scanning area; and determining a relative position relation between the gingiva and the scanning rod according to the first relative position relation and the second relative position relation, and splicing the three-dimensional data of the gingiva with the three-dimensional data of the scanning rod according to the relative position relation to acquire the matched data of the gingiva and the scanning rod.

2. The method as claimed in claim 1, wherein acquiring the first data comprises:

projecting a preset image into the oral cavity in the first state to acquire a structured light image of an inner surface of the oral cavity; and performing three-dimensional reconstruction according to the structured light image to determine the three-dimensional data of the gingiva.

3. The method as claimed in claim 2, wherein performing three-dimensional reconstruction according to the structured light image to determine the three-dimensional data of the gingiva comprises:

performing three-dimensional reconstruction according to the structured light image to acquire point cloud data characterizing the inner surface of the oral cavity, wherein each point in the point cloud data represents a position of the inner surface of the oral cavity;

determining the three-dimensional data of the gingiva by analyzing and processing the point cloud data.

4. The method as claimed in claim 1, wherein the method further comprising:

displaying first prompt information and second prompt information, wherein the first prompt information is used for prompting to scan the oral cavity in the first state, and the second prompt information is used for prompting to scan the oral cavity in the second state.

5. The method as claimed in claim 1, wherein the method further comprising:

converting the matched data acquired after completing the splicing into universal scanning rod data.

6. The method as claimed in claim 1, wherein the method further comprising: exporting the matched data as target matched data compatible with target software in a specified format.

7. The method as claimed in claim 1, wherein an abutment is mounted on the implant, and the abutment is a part in an implanting system for supporting and fixing an upper structure of the implant, the scanning rod is mounted on the implant through the abutment.

8. A computer device, comprising a memory, a processor, and a computer program stored in the memory and runnable on the processor, and when executing the computer program, the processor is configured to:

acquire first data of an oral cavity in a first state, wherein the oral cavity in the first state refers to that an implant has been implanted into the oral cavity, and the first data comprises three-dimensional data of a gingiva;

acquire second data of the oral cavity in a second state, wherein the oral cavity in the second state refers to that a scanning rod is mounted on the implant in the oral cavity, the second data comprises three-dimensional data of a mark point of the scanning rod mounted on the implant and scanning data corresponding to a scanning area, the scanning data comprises data of a gingiva and the mark point of the scanning rod in the scanning area; and perform a splicing operation on the three-dimensional data of the gingiva and the three-dimensional data of the mark point according to the scanning data of the scanning area to acquire matched data of the gingiva and the scanning rod;

the processor is configured to: project illuminating light into the oral cavity to acquire a mark point image of an inner surface of the oral cavity; determine the three-dimensional data of the mark point according to the mark point image; project a structured light image and the illuminating light alternately to the scanning area to acquire a structured light image and a mark point image of the scanning area; perform three-dimensional reconstruction according to the structured light image to acquire first point cloud data; determine the three-dimensional data of the mark point of the scanning area according to the mark point image; and determine the scanning data of the scanning area according to the three-dimensional data of the mark point of the scanning area and the first point cloud data;

the processor is configured to: determine three-dimensional data of the scanning rod according to the three-dimensional data of the mark point; splice the three-dimensional data of the gingiva with the scanning data of the scanning area to determine a first relative position relation between the gingiva and the scanning area; splice the three-dimensional data of the scanning rod with the scanning data of the scanning area according to the three-dimensional data of the mark point to determine a second relative position relation between the scanning rod and the scanning area; and determine a relative position relation between the gingiva and the scanning rod according to the first relative position relation and the second relative position relation, and splicing the three-dimensional data of the gingiva with the three-dimensional data of the scanning rod according to the relative position relation to acquire the matched data of the gingiva and the scanning rod.

9. The computer device as claimed in claim 8, the processor is configured to:

project a preset image into the oral cavity in the first state to acquire a structured light image of an inner surface of the oral cavity; and perform three-dimensional reconstruction according to the structured light image to determine the three-dimensional data of the gingiva.

10. The computer device as claimed in claim 8, the processor is configured to:

display first prompt information and second prompt information, wherein the first prompt information is used for prompting to scan the oral cavity in the first state, and the second prompt information is used for prompting to scan the oral cavity in the second state.

11. The computer device as claimed in claim 8, the processor is configured to:

convert the matched data acquired after completing the splicing into universal scanning rod data.

12. The computer device as claimed in claim 8, the processor is configured to: export the matched data as target matched data compatible with target software in a specified format.

13. A method for matching gingival data, comprising:

acquiring first data of an oral cavity in a first state, wherein the oral cavity in the first state refers to that an implant has been implanted into the oral cavity, and the first data comprises three-dimensional data of a gingiva;

acquiring second data of the oral cavity in a second state, wherein the oral cavity in the second state refers to that a scanning rod is mounted on the implant in the oral cavity, the second data comprises three-dimensional data of a mark point of the scanning rod mounted on the implant and scanning data corresponding to a scanning area, the scanning data comprises data of a gingiva and the mark point of the scanning rod in the scanning area; wherein acquiring the second data comprises: projecting a structured light image and illuminating light alternately into the oral cavity to acquire a structured light image and a mark point image in the oral cavity; performing three-dimensional reconstruction according to the structured light image to acquire second point cloud data; determining the three-dimensional data of the mark point according to the mark point image; and determining three-dimensional data of an inner surface of the oral cavity according to the second point cloud data and the three-dimensional data of the mark point; and performing a splicing operation on the three-dimensional data of the gingiva and the three-dimensional data of the mark point according to the scanning data of the scanning area to acquire matched data of the gingiva and the scanning rod;

wherein the performing the splicing operation on the three-dimensional data of the gingiva and the three-dimensional data of the mark point according to the scanning data of the scanning area to acquire the matched data of the gingiva and the scanning rod comprises: splicing the three-dimensional data of the gingiva with the scanning data of the scanning area to determine a third relative position relation between the gingiva and the scanning area; performing splicing according to the three-dimensional data of the mark point and the scanning data of the scanning area to determine a fourth relative position relation between the three-dimensional data of the mark point and the scanning area; and determining a relative position relation between the gingiva and the three-dimensional data of the mark point according to the third relative position relation and the fourth relative position relation, and splicing the three-dimensional data of the gingiva with the three-dimensional data of the scanning rod according to the relative position relation to acquire the matched data of the gingiva and the scanning rod.

* * * * *